US009813767B2

United States Patent
Christianson et al.

(10) Patent No.: US 9,813,767 B2
(45) Date of Patent: Nov. 7, 2017

(54) SYSTEM AND METHOD FOR MULTIPLE RIGHTS BASED VIDEO

(75) Inventors: Ryan Christianson, Lynnwood, WA (US); Jason Lewis, Issaquah, WA (US)

(73) Assignee: Disney Enterprises, Inc., Burbank, CA (US)

( * ) Notice: Subject to any disclaimer, the term of this patent is extended or adjusted under 35 U.S.C. 154(b) by 652 days.

(21) Appl. No.: 12/803,930

(22) Filed: Jul. 8, 2010

(65) Prior Publication Data

US 2012/0008918 A1 Jan. 12, 2012

(51) Int. Cl.
*H04N 9/80* (2006.01)
*H04N 21/472* (2011.01)
*H04N 21/234* (2011.01)
*H04N 21/254* (2011.01)
*H04N 21/258* (2011.01)

(52) U.S. Cl.
CPC . *H04N 21/47202* (2013.01); *H04N 21/23424* (2013.01); *H04N 21/2541* (2013.01); *H04N 21/25841* (2013.01); *H04N 21/25883* (2013.01)

(58) Field of Classification Search
CPC ...... H04N 5/85; H04N 9/8042; H04N 21/812; H04N 5/76; H04N 5/782; G11B 27/105; G11B 27/329; G11B 2220/2562; G11B 27/28; G11B 2220/90; G11B 2220/20; G11B 27/024; G11B 27/034
USPC ................................. 386/348–251
See application file for complete search history.

(56) References Cited

U.S. PATENT DOCUMENTS

| | | | |
|---|---|---|---|
| 5,774,170 A * | 6/1998 | Hite et al. .................. | 725/34 |
| 5,892,554 A | 4/1999 | Dicicco | |
| 6,446,261 B1 | 9/2002 | Rosser | |
| 8,107,786 B2 * | 1/2012 | Sardera ............... | G11B 27/005 386/203 |
| 8,296,794 B2 * | 10/2012 | Hughes et al. ............. | 725/34 |
| 2003/0023489 A1 * | 1/2003 | McGuire et al. ........... | 705/14 |
| 2004/0261100 A1 * | 12/2004 | Huber et al. ............... | 725/32 |
| 2005/0246734 A1 * | 11/2005 | Kover et al. ............... | 725/24 |

(Continued)

OTHER PUBLICATIONS

Hinkle, D., *Diablo 3 to include parental controls, region-specific gore edits* (Aug. 25, 2009) Retrieved from the internet: <http://www.joystiq.com/2009/08/25/diablo-3-to-include-parental-controls-region-specific-edits/>.

*Primary Examiner* — Nigar Chowdhury
(74) *Attorney, Agent, or Firm* — Farjami & Farjami LLP

(57) ABSTRACT

There is provided a system and method for multiple rights based video. Source video assets may be analyzed to identify segments associated with a restricted scope of rights, and replacement assets associated with rights of different restrictions may be provided. When a request is received to serve a particular source video asset, a correspondingly customized video asset may be constructed by analyzing the rights available to the target of the request and the associated rights of the available replacement assets. Multiple parameters may be utilized in such analysis, and may include criteria such as territorial region, audience age, paid subscription level, and intended distribution channel. Since video can be optimized for different targets largely automatically, wider distribution of content may be possible under stricter budget and schedule constraints. Potential benefits may include increased revenue streams, market penetration, and brand recognition.

20 Claims, 4 Drawing Sheets

(56) References Cited

U.S. PATENT DOCUMENTS

| | | | |
|---|---|---|---|
| 2006/0013554 A1* | 1/2006 | Poslinski | 386/46 |
| 2007/0204292 A1* | 8/2007 | Riedl et al. | 725/34 |
| 2008/0147497 A1* | 6/2008 | Tischer | 705/14 |
| 2008/0288973 A1* | 11/2008 | Carson et al. | 725/32 |
| 2009/0006211 A1* | 1/2009 | Perry | G06Q 30/02 705/14.66 |
| 2009/0193456 A1* | 7/2009 | Ahn | H04H 20/10 725/32 |
| 2009/0222853 A1* | 9/2009 | White et al. | 725/34 |
| 2010/0037253 A1* | 2/2010 | Sheehan et al. | 725/31 |
| 2010/0067882 A1 | 3/2010 | Axen | |
| 2010/0153994 A1* | 6/2010 | Alexander | 725/35 |
| 2011/0078740 A1* | 3/2011 | Bolyukh | H04N 5/44543 725/41 |
| 2011/0211812 A1* | 9/2011 | Tzoukermann et al. | 386/250 |
| 2011/0280545 A1* | 11/2011 | Kates | 386/235 |
| 2012/0106923 A1* | 5/2012 | Wada | 386/230 |

\* cited by examiner

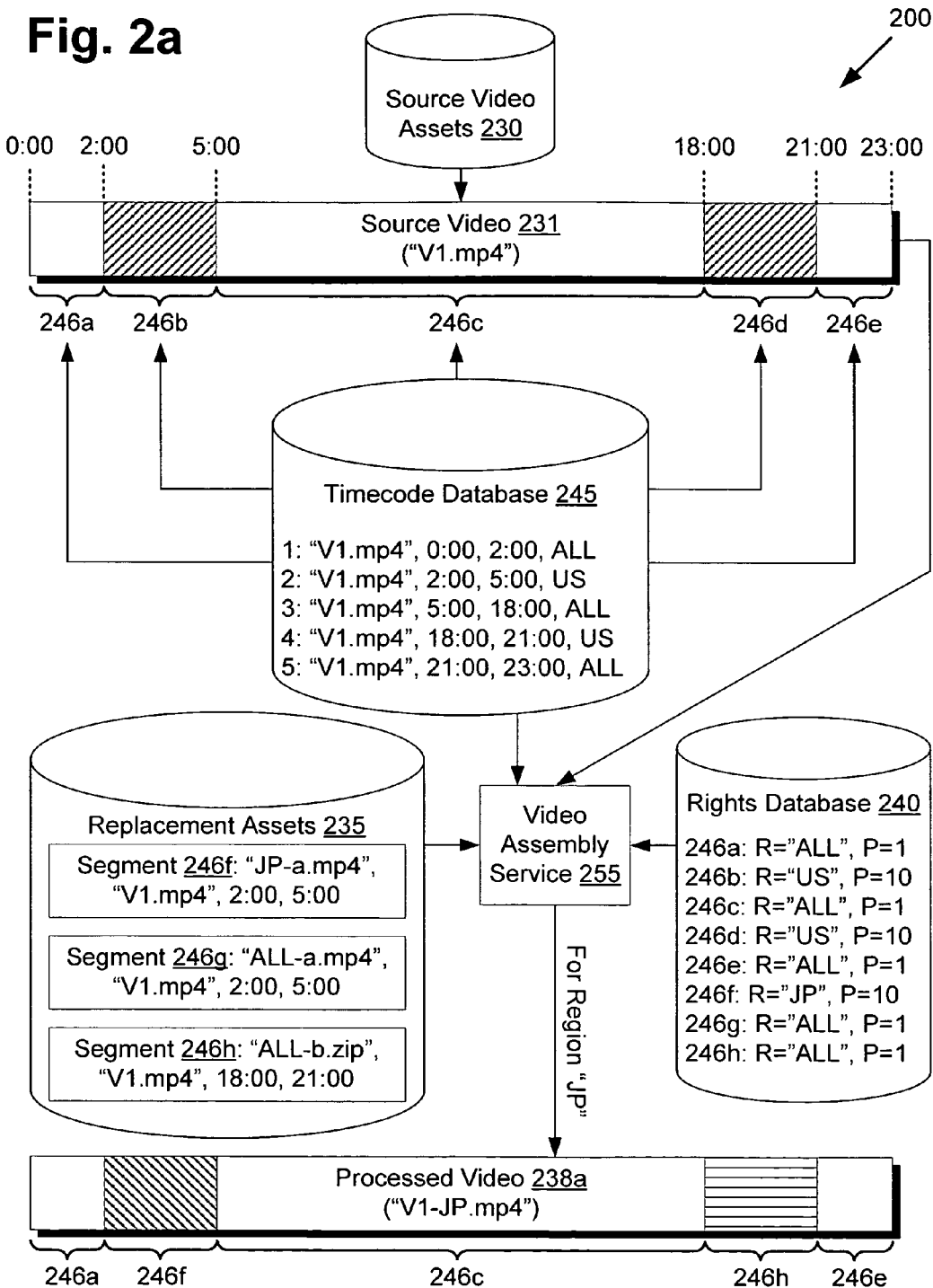

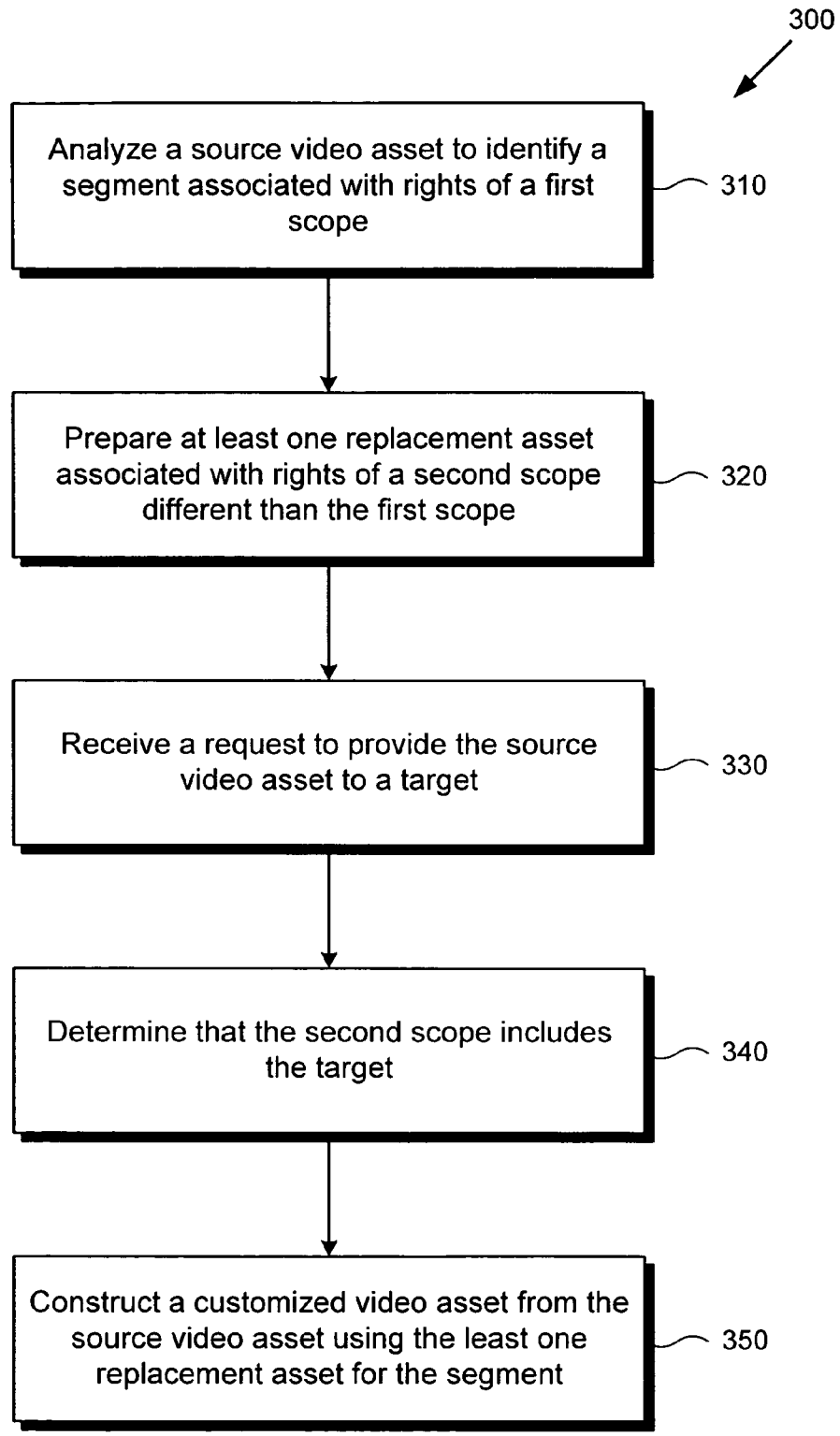

SYSTEM AND METHOD FOR MULTIPLE RIGHTS BASED VIDEO

BACKGROUND OF THE INVENTION

1. Field of the Invention

The present invention relates generally to video media. More particularly, the present invention relates to the creation of customized video media.

2. Background Art

When producing video content for different target audiences, for example to address specific regional markets, there is often the need to change, modify, or replace particular video or audio segments. Such action may be necessary due to licensing issues, limited contractual rights, ratings standards, subject matter restrictions, cultural considerations, or other reasons. Thus, before widespread distribution is possible, video content must be appropriately customized for different targets.

Conventionally, such customization must be carried out manually, requiring time consuming and labor intensive video processing workflows. This may significantly increase the amount of resources required for widespread distribution across different markets. Thus, due to budget and scheduling considerations, decisions may be made to restrict video programming to specific audiences such as only the domestic market, limiting market penetration and forfeiting potential new revenue streams.

Accordingly, there is a need to overcome the drawbacks and deficiencies in the art by providing a way to create customized video content in an efficient and cost effective manner.

SUMMARY OF THE INVENTION

There are provided systems and methods for multiple rights based video, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2a presents a diagram of a system for multiple rights based video processing a source video for one target region, according to one embodiment of the present invention; FIG. 3 shows a flowchart describing the steps, according to one embodiment of the present invention, by which multiple rights based video may be provided.

DETAILED DESCRIPTION OF THE INVENTION

The present application is directed to a system and method for multiple rights based video. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
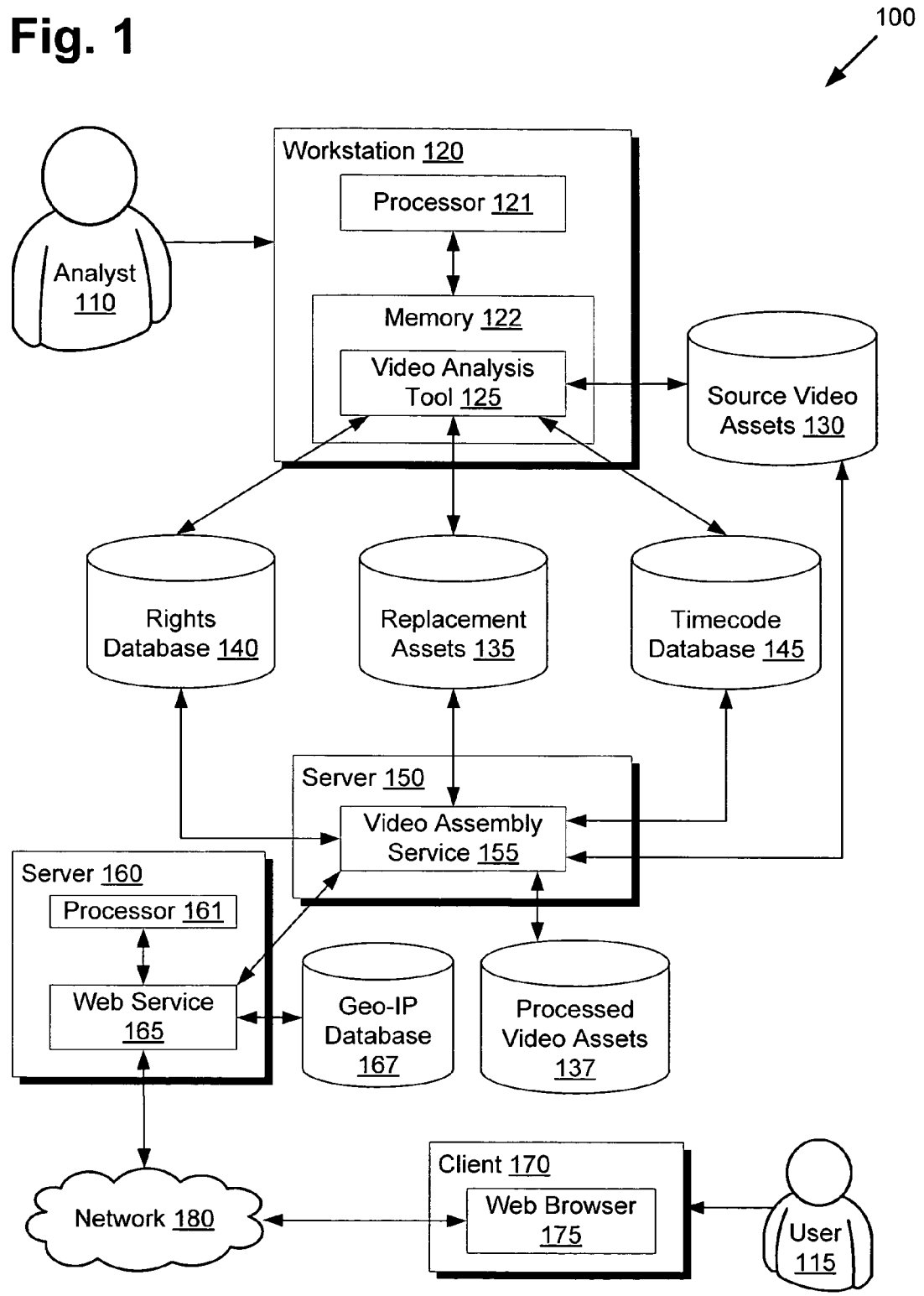
FIG. 1 presents a diagram of a system for multiple rights based video, according to one embodiment of the present invention.

FIG. 1 presents a diagram of a system for multiple rights based video, according to one embodiment of the present invention. Diagram 100 of FIG. 1 includes analyst 110, workstation 120, source video assets 130, replacement assets 135, rights database 140, timecode database 145, server 150, server 160, geo-IP database 167, processed video assets 137, network 180, client 170, and user 115. Workstation 120 includes processor 121 and memory 122. Memory 122 includes video analysis tool 125. Server 150 includes video assembly service 155. Server 160 includes processor 161 and web service 165. Client 170 includes web browser 175.

It should be noted that the embodiment shown in diagram 100 of FIG. 1 is only one specific embodiment and is simplified for clarity. Alternative embodiments may, for example, consolidate the functions of workstation 120, server 150, and server 160 into one server. The databases shown in FIG. 1 might also be consolidated into a single database server. Multiple servers may be utilized for load balancing, as in a content distribution network or a rendering cluster. Multiple clients may be served concurrently, and additional databases besides geo-IP database 167 and rights database 140 may be utilized to determine the rights of user 115 and the various media assets.

To prepare the system shown in diagram 100 for operation, analyst 110 may first use workstation 120 to provide video, picture, audio, and other media assets for use by video assembly service 155. Workstation 120 may, for example, comprise a desktop or laptop computer, with processor 121 executing video analysis tool 125 in memory 122. A display, not shown in FIG. 1, may show a user interface provided by video analysis tool 125, allowing analyst 110 to control video analysis tool 125 through input devices such as mice and keyboards (not shown in FIG. 1).

Source video assets 130 may contain original video content to be used as base material for multiple rights based video. After reviewing source video assets 130, analyst 110 may use video analysis tool 125 to populate replacement assets 135 with appropriate replacement content to prepare source video assets 130 for multiple rights based video. The replacement content may include video, audio; image slideshows, and other media. After supplying such media content, analyst 110 may also provide media metadata by editing and adding new records within timecode database 145 and rights database 140. Timecode database 145 may contain records pointing to specific time ranges and associated rights for media within source video assets 130. Rights database 140 may include rules, rights, and priorities for applying replacement assets 135 to source video assets 130. For example, rights database 140 may specify valid regional markets and priority levels for different video clips.

After analyst 110 populates replacement assets 135 and enters the relevant records into rights database 140 and timecode database 145, video assembly service 155 of server 150 may then begin to serve multiple rights based video to requesting parties. For example, as shown in FIG. 1, one embodiment may support a web based video distribution channel. Thus, server 160 may execute web service 165 on processor 161, which may comprise a web server such as the Apache web server. Client 170 may comprise the personal computer of an end user, or user 115. User 115 may use web browser 175 executing on client 170 to access web service 165 through network 180, which may comprise the Internet. For example, web browser 175 may be pointed to a URL for a video streaming website. Web service 165 may then, for example, resolve the IP address of client 170 and perform a look-up of the IP (Internet Protocol) address on geo-IP database 167. Geo-IP database 167 may then return the most likely territorial region that client 170 originates from, allowing web service 165 to determine and serve only content that is cleared and licensed for distribution in the region of user 115.

Thus, after user 115 directs web browser 175 to request a particular media file, web service 165 may consult video assembly service 155 to request a customized version of the requested media file that is appropriate for the territorial region of user 115, as determined by the previous geo-IP address look-up. Video assembly service 155 may be executing on a processor of server 150, not shown in FIG. 1. If the customized video is already pre-produced and available, then it may simply be retrieved from processed video assets 137. Otherwise, video assembly service 155 may create the customized video on the fly and store the encoded result in processed video assets 137 to service future requests. In this manner, distribution to several different targets, such as different territorial regions, can be easily accomplished without requiring manual customization for each specific target request.

Although the example shown in FIG. 1 concentrates on a server-side implementation for the generation of customized video, alternative embodiments may focus on a client-side implementation. For example, video assets may be provided through a secure link to a video player plug-in executing on web browser 175, and client 170 may assemble the customized video for local playback on client 170. However, security concerns and the ability to cache customized results may lead system designers to favor a server-side implementation over a client-side implementation.

Moreover, although the system shown in diagram 100 of FIG. 1 is specifically directed towards customization for different territorial regions, the system of the present invention can be broadly applied for any differentiation criteria, as desired. For example, instead of customizing by geographic region, source video assets may be customized depending on audience age, for example by removing or substituting content that may be inappropriate for younger audiences. Media may be customized based on the intended distribution channel, for example by providing different versions for mobile device consumption, broadcast television, and online on-demand streaming. Content may be cut, shortened, or modified for program syndication. Customized overlays or logos may be provided for content provided to different network affiliates. Programming may be modified based on consumer usage rights and payment plans, for example by reducing or increasing advertising breaks depending on subscription level or by adding supplemental bonus content only for premium level subscribers. Assets may also be customized using multiple criteria, for example using both region and audience age as criteria for customization.

Additionally, although the system shown in diagram 100 of FIG. 1 is directed towards a web distribution platform, the system may be used for other applications. For example, instead of serving end users directly through online distribution, the system may be restricted for internal use and distribution of finished customized videos may be carried out through standard distribution channels.

As previously noted, since replacement assets 135 may include a variety of content types such as video, audio and still images, the customization may include the replacement of video only, audio only, or both video and audio. Moreover, content may be entirely replaced with new content, or new content may be simply overlaid or mixed into existing content, depending on the desired effect and rights clearances.

Moving to FIG. 2a, FIG. 2a presents a diagram of a system for multiple rights based video processing a source video for one target region, according to one embodiment of the present invention. Diagram 200 of FIG. 2a includes source video assets 230, source video 231, segments 246a through 246h, timecode database 245, replacement assets 235, rights database 240, video assembly service 255, and processed video 238a. Source video assets 230 may correspond to source video assets 130 from FIG. 1, timecode database 245 may correspond to timecode database 145 from FIG. 1, replacement assets 235 may correspond to replacement assets 135 from FIG. 1, rights database 240 may correspond to rights database 140 from FIG. 1, and video assembly service 255 may correspond to video assembly service 155 from FIG. 1.

Source video assets 230 may include several different media assets, including source video 231, as shown in FIG. 2a. The contents of source video assets 230 may be prepared for a particular audience, such as the domestic US market. Thus, as shown in timecode database 245, source video 231 is composed of several segments that are either cleared for "ALL" regions (segments 246a, 246c, and 246e) or specifically for the "US" region only (segments 246b and 246d). Timecode database 245 includes database records 1 through 5, which all refer to source video 231 through the filename reference "V1.mp4" and identify the start times, end times, and acceptable regions for segments 246a through 246e, respectively. Although timecodes are provided using a minutes and seconds format for simplicity, alternative embodiments may use more precise measurements including milliseconds or use frame numbers rather than time offsets.

While source video 231 may be suitable for distribution in the US market, it may be desirable to distribute source video 231 to other markets outside of the US market. As previously described, an analyst may use a video analysis tool to supply replacement assets suitable for such other markets. Thus, as shown in FIG. 2a, the analyst may have populated replacement assets 235 with segments 246f, 246g, and 246h. As shown by the database entries within rights database 240, segment 246f is cleared for the "JP" or Japan region (R), whereas segments 246g and 246h are cleared for "ALL" regions. Additionally, rights database 240 also indicates the relative priority values (P) of each segment, with higher precedence indicated by larger values of P.

Segment 246f may comprise a video clip, "JP-a.mp4", intended to replace a portion of "V1.mp4" or source video 231 from start timecode 2:00 to end timecode 5:00. Note that while "JP-a.mp4" may have a matching runtime length of 3:00, this may not necessarily be the case. For example, if an application does not require processed video 238a to retain the same total runtime as source video 231, then "JP-a.mp4" may comprise a length less than or greater than 3:00. This may be the case for on-demand web streaming, where strict time schedules are not a concern. Conversely, if the runtime needs to be preserved between source and target videos, then video assembly service 255 may use various editing techniques to enforce the same total runtime. For example, lengthy clips may be played at a higher playback speed or truncated to fit, whereas shorter clips may played at a slower playback speed or padded with intermissions. This may be the case for traditional over the air broadcast schedules that must fit specific programming in allotted time periods.

Similarly, segment 246g may comprise a video clip, "ALL-a.mp4", intended to replace the same portion of "V1.mp4" or source video 231 from start timecode 2:00 to end timecode 5:00. However, as indicated by rights database 240, segment 246g is cleared for "ALL" regions whereas segment 246f is only cleared for the "JP" region. Additionally, segment 246f is set to a very high priority level 10, whereas segment 246g is set to a very low priority level 1.

When selecting content between timecode 2:00 and timecode 5:00 for generating a target video, video assembly service 255 must consider the regions and priorities between three segments, or original segment 246b and replacement segments 246f and 246g. If the target region is "US", then original segment 246b is selected. Replacement segment 246f is from an invalid region "JP" and is thus discarded, whereas replacement segment 246g is from a valid region "ALL" but has a lower priority "1" versus the priority "10" of original segment 246b. If the target region is "JP", then replacement segment 246f is selected, as shown in processed video 238a of FIG. 2a. Original segment 246b is from an invalid region "US" and is thus discarded, whereas replacement segment 246g is from a valid region "ALL" but has a lower priority "1" versus the priority "10" of replacement segment 246f. If the target region is another region other than "US" and "JP" such as "DE" or Germany, then replacement segment 246g is selected. Original segment 246b is from an invalid region "US" and replacement segment 246f is from an invalid region "JP", leaving only replacement segment 246g with the valid region "ALL" for selection.

Although segments 246f and 246g have been described as video files, other types of media may also be used as replacement assets. Thus, as shown in FIG. 2a, segment 246h may comprise a series of still images and an audio file stored in an archive, "ALL-b.zip", intended to replace the same portion of "V1.mp4" or source video 231 from start timecode 18:00 to end timecode 21:00. As indicated in rights database 240, segment 246h is cleared for "ALL" regions and has a priority value of 1. If video assembly service 255 selects segment 246h for content between timecode 18:00 and 21:00, then a 3:00 runtime video slideshow may be automatically generated using the still images and the audio file in "ALL-b.zip". Alternatively, a manual script specifying the image ordering, transitions, and other details of the slideshow may be included in the archive.

In alternative embodiments, the replacement asset may comprise only an audio file to be dubbed over an existing audio track. This may, for example, be utilized to provide localized language dubs, commentary, or to avoid performances without proper audio rights clearances. In other embodiments, the audio may be mixed into an existing audio track, for example to provide an added laugh track, or the audio may be used in an audio filter, for example to remove unwanted or distracting sounds from sporting events.

When selecting content between timecode 18:00 and timecode 21:00 for generating a target video, video assembly service 255 must consider the regions and priorities between two segments, or original segment 246d and replacement segment 246h. If the target region is "US", then original segment 246d is selected. Replacement segment 246h is from a valid region "ALL" but has a lower priority "1" versus the priority "10" of original segment 246d. If the target region is "JP", then replacement segment 246h is selected, as shown in processed video 238a of FIG. 2a. If the target region is another region other than "US" and "JP" such as "DE", then replacement segment 246h is again selected. When targeting for regions other than "US", original segment 246d becomes an invalid region "US" and is thus discarded.

Figure 2B:
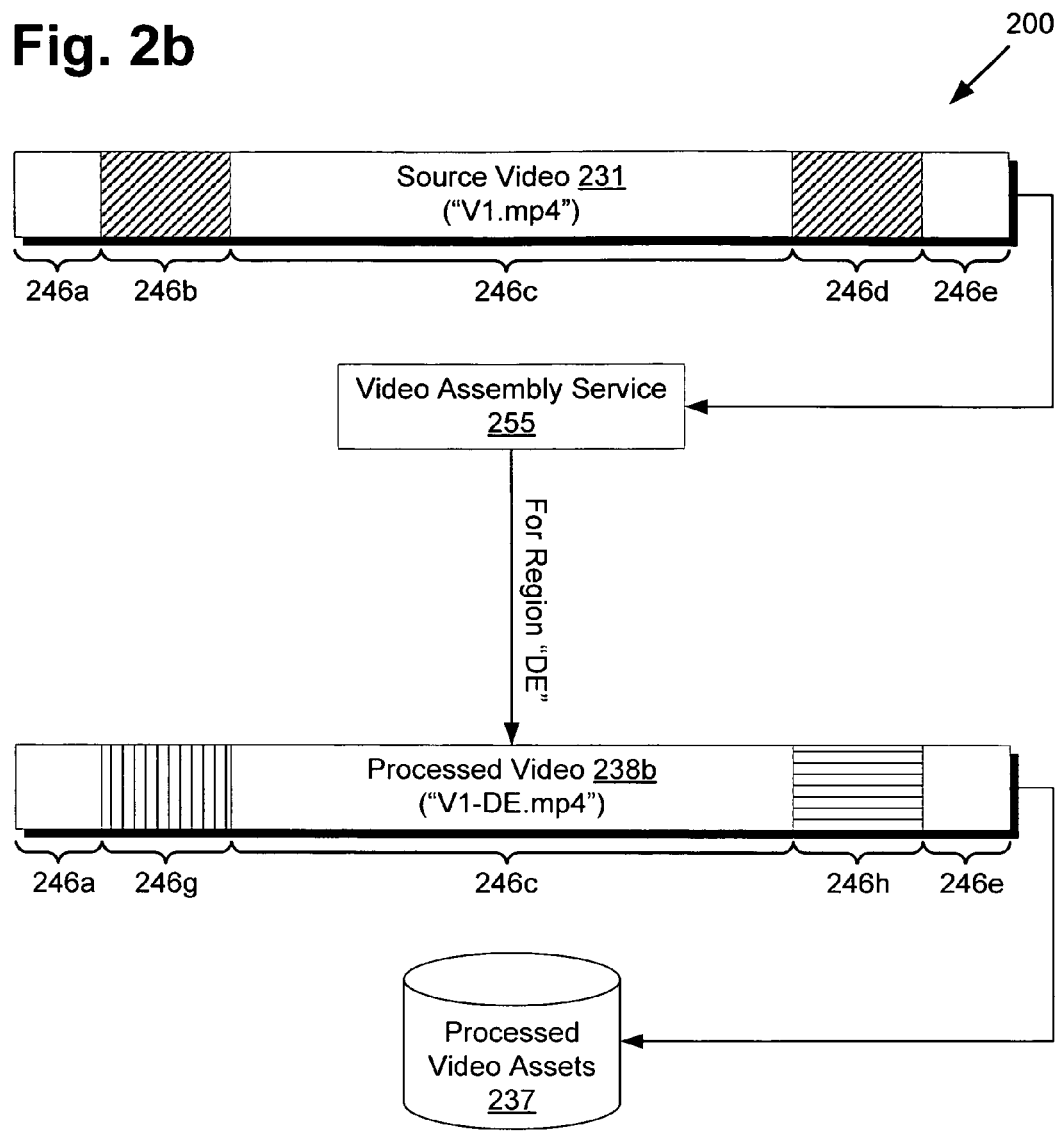
FIG. 2b presents a diagram of a system for multiple rights based video processing a source video for another target region, according to one embodiment of the present invention.

FIG. 2b presents a diagram of a system for multiple rights based video processing a source video for another target region, according to one embodiment of the present invention. Diagram 200 of FIG. 2b includes source video 231, video assembly service 255, processed video 238b, segments 246a, 246b, 246c, 246d, 246e, 246g and 246h, and processed video assets 237. Processed video assets 237 may correspond to processed video assets 137 from FIG. 1.

While FIG. 2a showed an example for generating processed video 238a targeted for the "JP" region, FIG. 2b shows an example for generating processed video 238b targeted for the "DE" region. For clarity, source assets 230, replacement assets 235, timecode database 245, and rights database 240 have been omitted from FIG. 2b. As previously described, if the target region is "DE", then video assembly service 255 will use the rights and priorities in the databases to select segment 246g for start timecode 2:00 to end timecode 5:00 and segment 246h for start timecode 18:00 to end timecode 21:00, resulting in processed video 238b or "V1-DE.mp4" as shown in FIG. 2b. After processed video 238b is created, it may then be stored in processed video assets 237. Thus, any future requests for source video 231, or "V1.mp4", customized for the "DE" region may simply retrieve processed video 238b or "V1-DE.mp4". In a similar manner, processed video 238a from FIG. 2a may also be stored in processed video assets 237 of FIG. 2b to respond to future requests for "V1.mp4" customized for the "JP" region.

Moving to FIG. 3, FIG. 3 shows a flowchart describing the steps, according to one embodiment of the present invention, by which multiple rights based video may be provided. Certain details and features have been left out of flowchart 300 that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300.

Referring to step 310 of flowchart 300 in FIG. 3, diagram 100 of FIG. 1, and diagram 200 of FIG. 2a, step 310 of flowchart 300 comprises analyst 110 analyzing source video assets 130 using video analysis tool 125 executing on processor 121 of workstation 120 to identify segment 246b associated with rights of a first scope. More specifically, as shown in FIG. 2a, timecode database 245 indicates in record #2 that segment 246b is associated with rights of a first scope including a valid territorial region of "US". Analyst 110 may, for example, use video analysis tool 125 to review source video 231 and, after determining that the portion between timecode 2:00 and 5:00 is only cleared for the "US" region, enter record #2 into timecode database 245. Additionally, analyst 110 may add a corresponding record to rights database 240, also indicating that segment 246b is cleared for the "US" region and has a priority level of "10". As previously discussed, the particular configuration of data structures shown in FIGS. 1 and 2a is only one embodiment and may be changed to suit alternative embodiments.

Referring to step 320 of flowchart 300 in FIG. 3, diagram 100 of FIG. 1, and diagram 200 of FIG. 2a, step 320 of flowchart 300 comprises analyst 110 preparing segment 246f associated with rights of a second scope different from the first scope in step 310. More specifically, as shown in FIG. 2a, segment 246f is associated with rights of a second scope including a valid territorial region of "JP", or Japan, which is different from the first scope including a valid territorial region of "US". As previously described, other parameters may be used to define the scope of rights, such as target audience age, paid subscription levels, and other criteria.

It should be noted that while segment 246f was arbitrarily selected for preparation in step 320, analyst 110 may prepare segment 246g instead, or both segments 246f and 246g, or more than two segments, as contemplated by the "at least one replacement asset" language. Moreover, the first and second scopes are not necessarily mutually exclusive. For example, if segment 246g was chosen for step 320, then the second scope would cover the valid territorial region of "ALL", which also includes "US". However, the first scope is not completely subsumed into the second scope due to the lower priority value for segment 246g. Thus, rights can be flexibly configured using multiple parameters to provide fine-tuned optimized for specific target audiences, and analyst 110 can provide multiple alternative replacement assets to cover different target audiences.

Referring to step 330 of flowchart 300 in FIG. 3, diagram 100 of FIG. 1, and diagram 200 of FIG. 2a, step 330 of flowchart 300 comprises web service 165 executing on processor 161 of server 160 receiving a request from web browser 175 of client 170 to provide source video 231 to a target client 170 for viewing by user 115. For example, user 115 may navigate to a video streaming site hosted on web service 165 and click on a specific media file corresponding to source video 231 or "V1.mp4" shown in FIG. 2a. However, as previously noted, a publicly accessible web server is only one particular service application and alternative embodiments may utilize different service structures such as a private internal only system for building a customized content store.

Referring to step 340 of flowchart 300 in FIG. 3 and diagram 100 of FIG. 1, step 340 of flowchart 300 comprises web service 165 executing on processor 161 of server 160 performing a query against geo-IP database 137 using an IP address of client 170 to determine that the second scope of step 320 includes the target client 170 in step 330. Thus, for example, client 170 may access network 180 using a Japanese Internet Service Provider (ISP) having an established block of IP addresses. These known IP addresses may be recorded in geo-IP database 167 as belonging to the "JP" or Japan territorial region. Thus, when web service 165 obtains an IP address of client 170 and performs the query, geo-IP database 167 can confirm that the second scope associated with segment 246f, which defines "JP" as a valid territorial region, includes client 170.

Referring to step 350 of flowchart 300 in FIG. 3 and diagram 200 of FIG. 2a, step 350 of flowchart 300 comprises video assembly service 255 constructing processed video 238a from source video 231 using segment 246f from step 320 for segment 246b. As shown in FIG. 2a, the existing segment from timecode 2:00 to timecode 5:00 is simply replaced completely by new replacement segment 246f. However, depending on the selected replacement asset, the method of construction may differ. For example, if an audio-only resource were selected, then only the audio stream between timecode 2:00 to timecode 5:00 may be replaced. Similarly, if a video-only resource with no sound were selected, then only the video stream may be replaced. As previously discussed, a plurality of images for a slideshow may also be utilized instead of a video file. Furthermore, various processing steps such as time deformation may be applied to keep the runtime the same as the original segment 246b, or 3:00 long, and replacement content may be mixed, overlaid, or filtered on top of existing content rather than completely replacing existing content. Thus, content can be customized as little or as much as necessary, depending on the extent of available distribution rights and other conditions.

After step 350, the requested video asset may be complete if no other segments require customization. If this is not the case, then flowchart 300 may be repeated for additional identified segments, such as segment 246d shown in FIG. 2a. Assuming such a repeat process occurs, the final result may appear similar to processed video 238a with segment 246f replacing segment 246b and segment 246h replacing segment 246d. The final result may then be cached in a storage area, such as processed video assets 137 of FIG. 1, and the original request may be serviced using web service 165 by providing processed video 238a to web browser 175 over network 180 for local playback on client 170. Thus, as evident by the steps of flowchart 300, if analyst 110 carries out all the necessary rights identification and metadata work for source video assets, then customized video assets optimally tailored to different target audiences having different rights clearances can be readily generated using automated processes, avoiding the need to manually create various customized video assets. As a result, the total effort and resources required to create multiple rights based video is reduced, encouraging broader distribution of video content and providing many potential benefits such as increased revenue streams, market penetration, and brand recognition.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:
1. A method for use by a system including a server having a processor, the method comprising:
  receiving, using the processor, a request to provide a source video asset to a target, wherein the system includes a source video asset having a first non-advertising segment associated with distribution license rights of a first scope, wherein the first non-advertising segment is within the source video asset and is identified by a start time and an end time, and at least one non-advertising replacement asset from a plurality of non-advertising replacement assets associated with distribution license rights of a second scope different than the first scope, wherein each of the plurality of non-advertising replacement assets includes a relative priority value set by a distributor of the source video asset;

determining that the distribution license rights of the second scope includes the target; and constructing a customized video asset from the source video asset by placing the at least one non-advertising replacement asset within the source video asset at a location identified by the start time for replacing the first non-advertising segment with the at least one non-advertising replacement asset, wherein the at least one non-advertising replacement asset is selected from the plurality of non-advertising replacement assets using the relative priority value set by the distributor of the source video asset, wherein the relative priority value is in a metadata of the at least one non-advertising replacement asset, and wherein a playback speed of the at least one non-advertising replacement asset is adjusted to match the start time and the end time.

2. The method of claim 1, wherein the first scope and the second scope each include valid territorial regions.

3. The method of claim 2, wherein the target comprises an Internet accessible client, and wherein the determining comprises a geographic Internet Protocol (IP) address lookup confirming that the client is within a valid territorial region of the second scope.

4. The method of claim 1, wherein the first scope and the second scope each include audience age ranges.

5. The method of claim 1, wherein the at least one non-advertising replacement asset comprises a video asset and a plurality of images for a slideshow, and wherein the customized video asset includes an audio asset from the source video asset at the location identified by the start time for replacing the first non-advertising segment.

6. The method of claim 1, wherein the at least one non-advertising replacement asset comprises at least one of an audio asset and a plurality of images for a slideshow.

7. The method of claim 1, wherein the first non-advertising segment comprises a first original programming content and the at least one non-advertising replacement asset comprises a second original programming content.

8. The method of claim 1, wherein the constructing processes the at least one non-advertising replacement asset to match a runtime of the first non-advertising segment.

9. The method of claim 1, wherein the constructing pads the at least one non-advertising replacement asset with at least one intermission to match the start time and the end time.

10. The method of claim 1, wherein the constructing adjusts the playback speed of the at least one non-advertising replacement asset, such that a total runtime of the customized video asset matches a total runtime of the source video asset, and wherein the playback speed of the at least one non-advertising replacement asset is adjusted such that a runtime of the at least one non-advertising replacement asset matches a runtime of the first non-advertising segment while the source video asset is played at a normal viewing speed.

11. A system comprising:
a source video asset having a first non-advertising segment associated with distribution license rights of a first scope, wherein the first non-advertising segment is within the source video asset and is identified by a start time and an end time, and at least one non-advertising replacement asset associated from a plurality of non-advertising replacement assets with distribution license rights of a second scope different than the first scope, wherein each of the plurality of non-advertising replacement assets includes a relative priority value set by a distributor of the source video asset;

a server comprising a processor configured to:
receive a request to provide the source video asset to a target;
determine that the distribution license rights of the second scope includes the target; and
construct a customized video asset from the source video asset by placing the at least one non-advertising replacement asset within the source video asset at a location identified by the start time for replacing the first non-advertising segment with the at least one non-advertising replacement asset, wherein the at least one non-advertising replacement asset is selected from the plurality of non-advertising replacement assets using the relative priority value set by the distributor of the source video asset, wherein the relative priority value is in a metadata of the at least one non-advertising replacement asset, and wherein a playback speed of the at least one non-advertising replacement asset is adjusted to match the start time and the end time.

12. The system of claim 11, wherein the processor of the server is further configured to construct by adjusting the playback speed of the at least one non-advertising replacement asset, such that a total runtime of the customized video asset matches a total runtime of the source video asset, and wherein the playback speed of the at least one non-advertising replacement asset is adjusted such that a runtime of the at least one non-advertising replacement asset matches a runtime of the first non-advertising segment while the source video asset is played at a normal viewing speed.

13. The system of claim 11, wherein the first scope and the second scope each include valid territorial regions.

14. The system of claim 13, wherein the target comprises an Internet accessible client, and wherein the processor of the server is further configured to determine by performing a geographic Internet Protocol (IP) address lookup to confirm that the client is within a valid territorial region of the second scope.

15. The system of claim 11, wherein the first scope and the second scope each include audience age ranges.

16. The system of claim 11, wherein the at least one non-advertising replacement asset comprises a video asset and a plurality of images for a slideshow, and wherein the customized video asset includes an audio asset from the source video asset at the location identified by the start time for replacing the first non-advertising segment.

17. The system of claim 11, wherein the at least one non-advertising replacement asset comprises at least one of an audio asset and a plurality of images for a slideshow.

18. The system of claim 11, wherein the first non-advertising segment comprises a first original programming content and the at least one non-advertising replacement asset comprises a second original programming content.

19. The system of claim 11, wherein the processor of the server is further configured to construct by processing the at least one non-advertising replacement asset to match a runtime of the first non-advertising segment.

20. A method for use by a system including a server having a processor, the method comprising:
receiving, using the processor, a request to provide a source video asset to a target, wherein the system includes a source video asset having a first non-advertising segment associated with distribution license rights of a first scope, wherein the first non-advertising segment is within the source video asset and is identified by a start time and an end time, and at least one non-advertising replacement asset from a plurality of non-advertising replacement assets associated with distribution license rights of a second scope different than the first scope, wherein each of the plurality of non-advertising replacement assets includes a relative priority value set by a distributor of the source video asset;

determining that the distribution license rights of the second scope includes the target; and constructing a customized video asset from the source video asset by placing the at least one non-advertising replacement asset within the source video asset at a location identified by the start time for replacing the first non-advertising segment with the at least one non-advertising replacement asset, wherein the at least one non-advertising replacement asset is selected from the plurality of non-advertising replacement assets using the relative priority value set by the distributor of the source video asset, wherein the relative priority value is in a metadata of the at least one non-advertising replacement asset.

\* \* \* \* \*